(12) United States Patent
Hori

(10) Patent No.: US 10,579,311 B2
(45) Date of Patent: *Mar. 3, 2020

(54) INFORMATION PROCESSING APPARATUS, INFORMATION PROCESSING METHOD, AND STORAGE MEDIUM

(71) Applicant: Ricoh Company, Ltd., Tokyo (JP)

(72) Inventor: Seijiro Hori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/667,825

(22) Filed: Aug. 3, 2017

(65) Prior Publication Data

US 2017/0329560 A1 Nov. 16, 2017

Related U.S. Application Data

(63) Continuation of application No. 13/557,367, filed on Jul. 25, 2012, now Pat. No. 9,756,144.

(30) Foreign Application Priority Data

Aug. 1, 2011 (JP) .................................. 2011-168494

(51) Int. Cl.
G06F 3/12 (2006.01)
H04N 1/00 (2006.01)
H04L 29/08 (2006.01)
H04L 29/12 (2006.01)

(52) U.S. Cl.
CPC .......... *G06F 3/1204* (2013.01); *G06F 3/1239* (2013.01); *G06F 3/1265* (2013.01);
(Continued)

(58) Field of Classification Search
CPC ..... H04N 2201/0094; H04N 2201/001; H04N 1/0023; H04N 2201/3205; G06F 21/608;
(Continued)

(56) References Cited

U.S. PATENT DOCUMENTS 6,553,375 B1   4/2003   Huang et al.
7,904,831 B2   3/2011   Kizaki
(Continued)

FOREIGN PATENT DOCUMENTS

EP   2299685      3/2011
JP   2010-074302   4/2010
JP   2010-157027   7/2010

OTHER PUBLICATIONS

Extended European search report dated Feb. 1, 2013 in EP Application No. 12177769.2 filed on Jul. 25, 2012.

*Primary Examiner* — William G Trost, IV
*Assistant Examiner* — Imran Moorad
(74) *Attorney, Agent, or Firm* — IPUSA, PLLC

(57) ABSTRACT

An information processing apparatus includes a user list providing unit configured to receive device identification information from a current device connected via a network and to send, to the current device, a user list including one or more user identifiers that are stored in a storage unit in association with the received device identification information; and a program list providing unit configured to receive a user identifier that is selected at the current device from the user identifiers in the user list and to send, to the current device, a program list including sets of program information stored in the storage unit in association with the received user identifier.

6 Claims, 15 Drawing Sheets

(52) U.S. Cl.
CPC .......... *G06F 3/1271* (2013.01); *G06F 3/1285* (2013.01); *G06F 3/1288* (2013.01); *H04L 67/306* (2013.01); *H04N 1/0097* (2013.01); *H04N 1/00225* (2013.01); *H04N 1/00244* (2013.01); *H04N 1/00408* (2013.01); *H04N 1/00424* (2013.01); *H04N 1/00435* (2013.01); *H04N 1/00941* (2013.01); *H04N 1/00973* (2013.01); *H04L 61/1511* (2013.01); *H04L 67/16* (2013.01); *H04N 2201/0039* (2013.01); *H04N 2201/0046* (2013.01); *H04N 2201/0094* (2013.01)

(58) Field of Classification Search
CPC .......... G06F 21/629; G06F 2221/2141; G06F 3/04842; G06F 3/1238; G06F 2201/0094
USPC ........................................................ 709/204
See application file for complete search history.

(56) References Cited

U.S. PATENT DOCUMENTS

| | | |
|---|---|---|
| 8,316,076 B2 | 11/2012 | Shudo |
| 2003/0107569 A1 | 6/2003 | Endo et al. |
| 2006/0070011 A1* | 3/2006 | Matsuhara ............ G06F 3/0237 715/816 |
| 2007/0201723 A1* | 8/2007 | Ito ..................... G06F 17/30011 382/100 |
| 2008/0092231 A1 | 4/2008 | Awata |
| 2008/0174812 A1 | 7/2008 | Lee et al. |
| 2009/0019490 A1 | 1/2009 | Tanikawa |
| 2010/0039662 A1 | 2/2010 | Reddy et al. |
| 2010/0067035 A1 | 3/2010 | Kawakubo et al. |
| 2010/0165388 A1 | 7/2010 | Ikeura |
| 2010/0180022 A1* | 7/2010 | Fujita ................... G06F 9/44505 709/223 |
| 2010/0225950 A1 | 9/2010 | Yasuhara |
| 2010/0235772 A1* | 9/2010 | Ikeura ................ H04N 1/00965 715/771 |
| 2011/0058208 A1* | 3/2011 | Takahashi ............ G06F 3/1222 358/1.14 |
| 2011/0134462 A1 | 6/2011 | Suto |
| 2011/0134466 A1 | 6/2011 | Nakagawa |
| 2011/0154227 A1 | 6/2011 | Kang |
| 2011/0164269 A1 | 7/2011 | Kamishiro |
| 2012/0054854 A1 | 3/2012 | Kim et al. |

* cited by examiner

FIG.9

| USER ID | GROUP ID | REGISTERED APPLICATION | 25 |
|---------|----------|------------------------|-----|
| USER A  | GROUP X  | apl1<br>apl2           | ... |
| USER B  | GROUP X  | apl3                   | ... |
| USER C  | GROUP Y  | apl4                   | ... |
| ...     | ...      |                        | ... |

FIG.10

| APPLICATION ID | LINKED FUNCTION IDENTIFIER | DISPLAY INFORMATION | CONFIGURATION INFORMATION | FILE NAME | |
|---|---|---|---|---|---|
| apl1 | scan | ... | ... | ... | ... |
| apl2 | print | ... | ... | ... | ... |
| apl3 | scan | ... | ... | ... | ... |
| .. | .. | .. | .. | .. | .. |

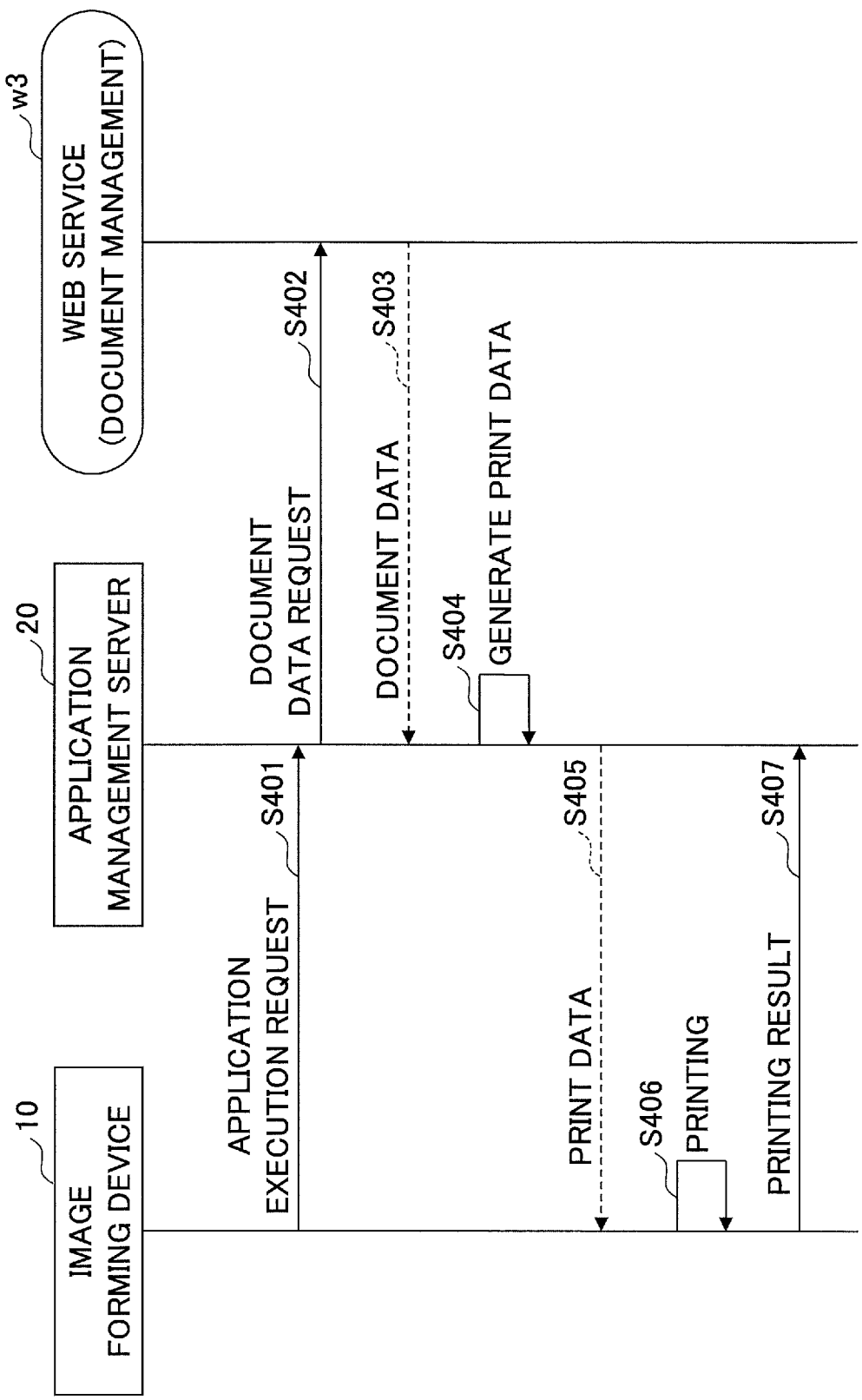

INFORMATION PROCESSING APPARATUS, INFORMATION PROCESSING METHOD, AND STORAGE MEDIUM

CROSS-REFERENCE TO RELATED APPLICATIONS

The present application is a continuation application of U.S. patent application Ser. No. 13/557,367, and is based upon and claims the benefit of priority of Japanese Patent Application No. 2011-168494, filed on Aug. 1, 2011, the entire contents of which are incorporated herein by reference.

BACKGROUND OF THE INVENTION

1. Field of the Invention

An aspect of this disclosure relates to an information processing apparatus, an information processing method, and a storage medium.

2. Description of the Related Art

Japanese Laid-Open Patent Publication No. 2010-157027 discloses programs (called "net applications") that are installed in personal computers (PCs) connected via a network with image forming devices. The net applications cause the PCs to perform process flows in collaboration with the image forming devices.

In the technology disclosed in JP2010-157027, when the net applications are started, users who have started the net applications are advertised on the network. Each image forming device receives the advertisements from the PCs and manages a list of users who have started the net applications on the respective PCs. In response to a command from a user, the image forming device displays the list of users on an operations panel. The user selects an item corresponding to the user him/herself from the list of users to use the net applications that have been started on the PC of the user.

As another approach, applications like the net applications of JP2010-157027 may be associated with users and centrally managed at a server, instead of at respective PCs of the users. In this case, an image forming device may be configured to display, on an operations panel, a list of users being managed at the server.

With this configuration, however, as the number of users registered in the server increases and the number of users in the list of users displayed on the operations panel increases, it becomes difficult for a user to find out an item such as an icon corresponding to the user him/herself from the list.

SUMMARY OF THE INVENTION

In an aspect of this disclosure, there is provided an information processing apparatus capable of communicating via a network with plural devices. The information processing apparatus includes a user list providing unit configured to receive device identification information from a current device of the devices and to send, to the current device, a user list including one or more user identifiers that are stored in a storage unit in association with the received device identification information; and a program list providing unit configured to receive a user identifier that is selected at the current device from the user identifiers in the user list and to send, to the current device, a program list including sets of program information stored in the storage unit in association with the received user identifier.

BRIEF DESCRIPTION OF THE DRAWINGS

FIG. 9 is a table illustrating an exemplary configuration of user information;

FIG. 10 is a table illustrating an exemplary configuration of application information;

FIG. 15 is a sequence chart illustrating an exemplary process of executing a print application.

DESCRIPTION OF THE PREFERRED EMBODIMENTS

Figure 1:
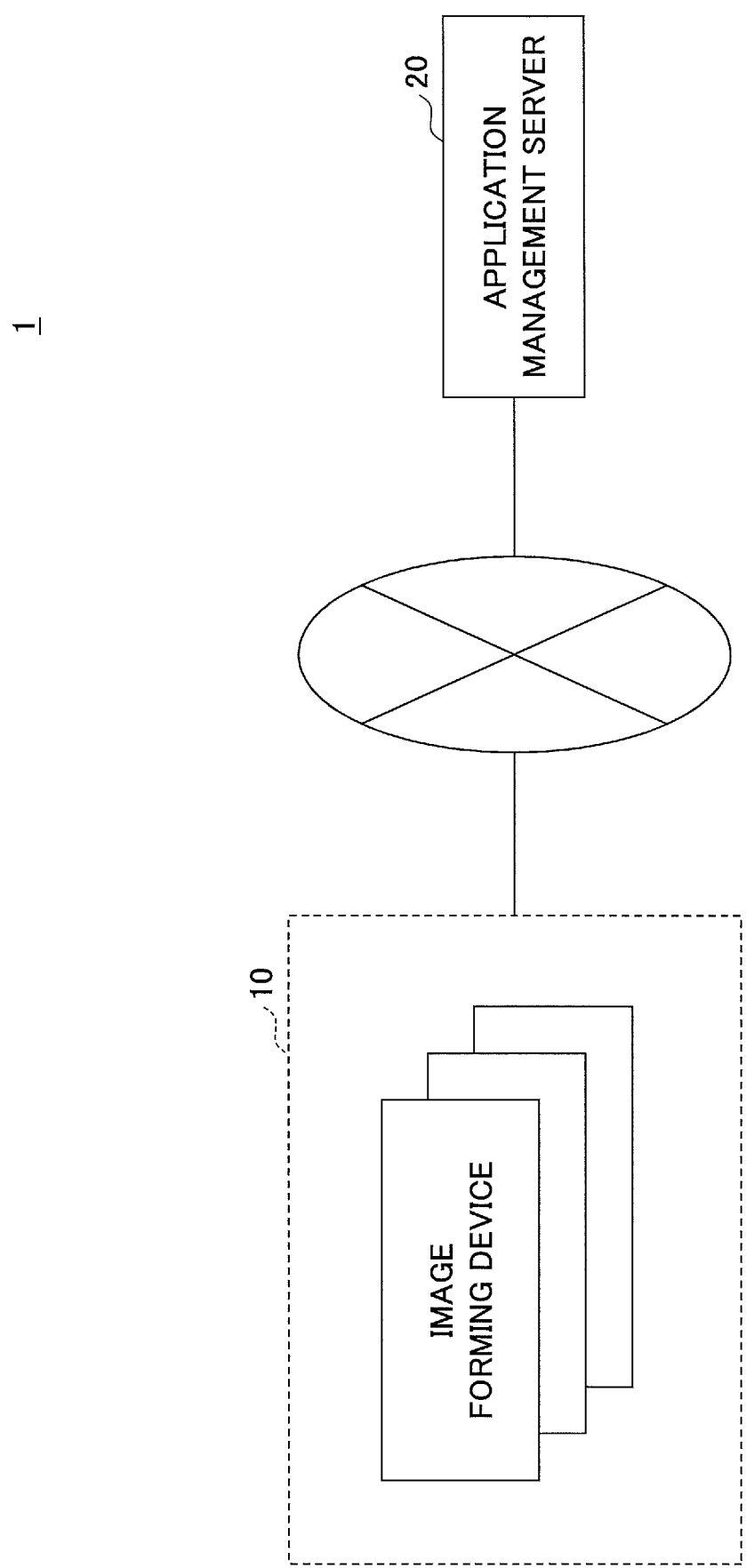
FIG. 1 is a drawing illustrating an exemplary configuration of an information processing system according to an embodiment.

Preferred embodiments of the present invention are described below with reference to the accompanying drawings. FIG. 1 is a drawing illustrating an exemplary configuration of an information processing system 1 according to an embodiment. As illustrated in FIG. 1, the information processing system 1 may include one or more image forming devices 10 and an application management server 20 that are connected via a (wired or wireless) network such as a local area network (LAN) or the Internet.

The image forming device 10 may be, for example, a multifunction peripheral including two or more functions such as printing, scanning, copying, and facsimile transmission and reception. Alternatively, the image forming device 10 may be a device such as a printer, a scanner, a copier, or a facsimile machine having one function.

The application management server 20 may be implemented by a computer and provides services (e.g., Web services) for managing application programs (hereafter, simply referred to as "applications") that perform predetermined process flows (or workflows) in collaboration with the image forming devices 10 and for controlling execution of the applications. The application management server 20 may be connected via the Internet to multiple image forming devices 10 and shared by plural offices and/or companies. Alternatively, the application management server 20 may be provided in an intranet of a company or in each office.

Figure 2:
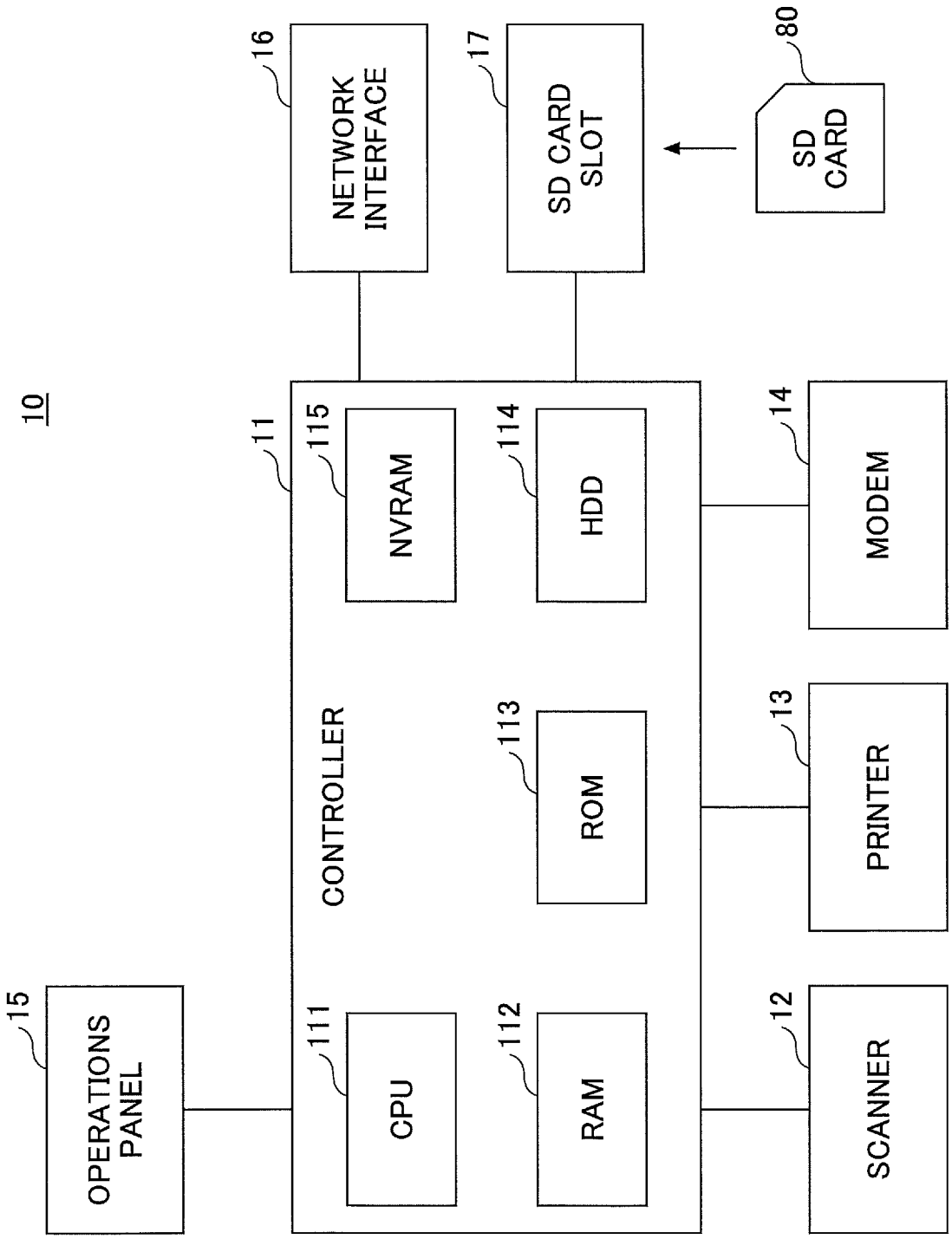
FIG. 2 is a block diagram illustrating an exemplary hardware configuration of an image forming device according to an embodiment.

FIG. 2 is a block diagram illustrating an exemplary hardware configuration of the image forming device 10. As illustrated in FIG. 2, the image forming device 10 may include, as hardware components, a controller 11, a scanner 12, a printer 13, a modem 14, an operations panel 15, a network interface 16, and a secure digital (SD) card slot 17.

The controller 11 may include a CPU 111, a RAM 112, a ROM 113, an HDD 114, and an NVRAM 115. The ROM 113 stores, for example, programs and data used by the programs. The RAM 112 is used, for example, as a storage area into which programs are loaded and as a work area for the loaded programs. The CPU 111 executes the programs loaded into the RAM 112 to implement various functions. The HDD 114 stores, for example, programs and data used by the programs.

The scanner 12 is a hardware component for scanning a document to obtain image data. The printer 13 is a hardware component for printing print data on a recording medium such as paper. The modem 14 is a hardware component for connecting the image forming device 10 to a telephone line and is used to send and receive image data for facsimile communications. The operations panel 15 is a hardware component including an input unit such as buttons for receiving user inputs and a display unit such as a liquid crystal display panel. The network interface 16 is a hardware component for connecting the image forming device 10 to a (wired or wireless) network such as a local area network (LAN). The SD card slot 17 reads, for example, programs stored in a secure digital (SD) card 80. With the image forming device 10 configured as described above, in addition to the programs stored in the ROM 113 and the HDD 114, programs stored in the SD card 80 can be loaded into the RAM 112 and executed. Instead of the SD card 80, any other storage medium (e.g., a CD-ROM or a universal serial bus (USB) memory) may be used for this purpose. That is, a storage medium that can be mounted on the image forming device 10 is not limited to the SD card 80. When a storage medium other than the SD card 80 is used, the SD card slot 17 may be replaced with a hardware component corresponding to the storage medium used.

Figure 3:
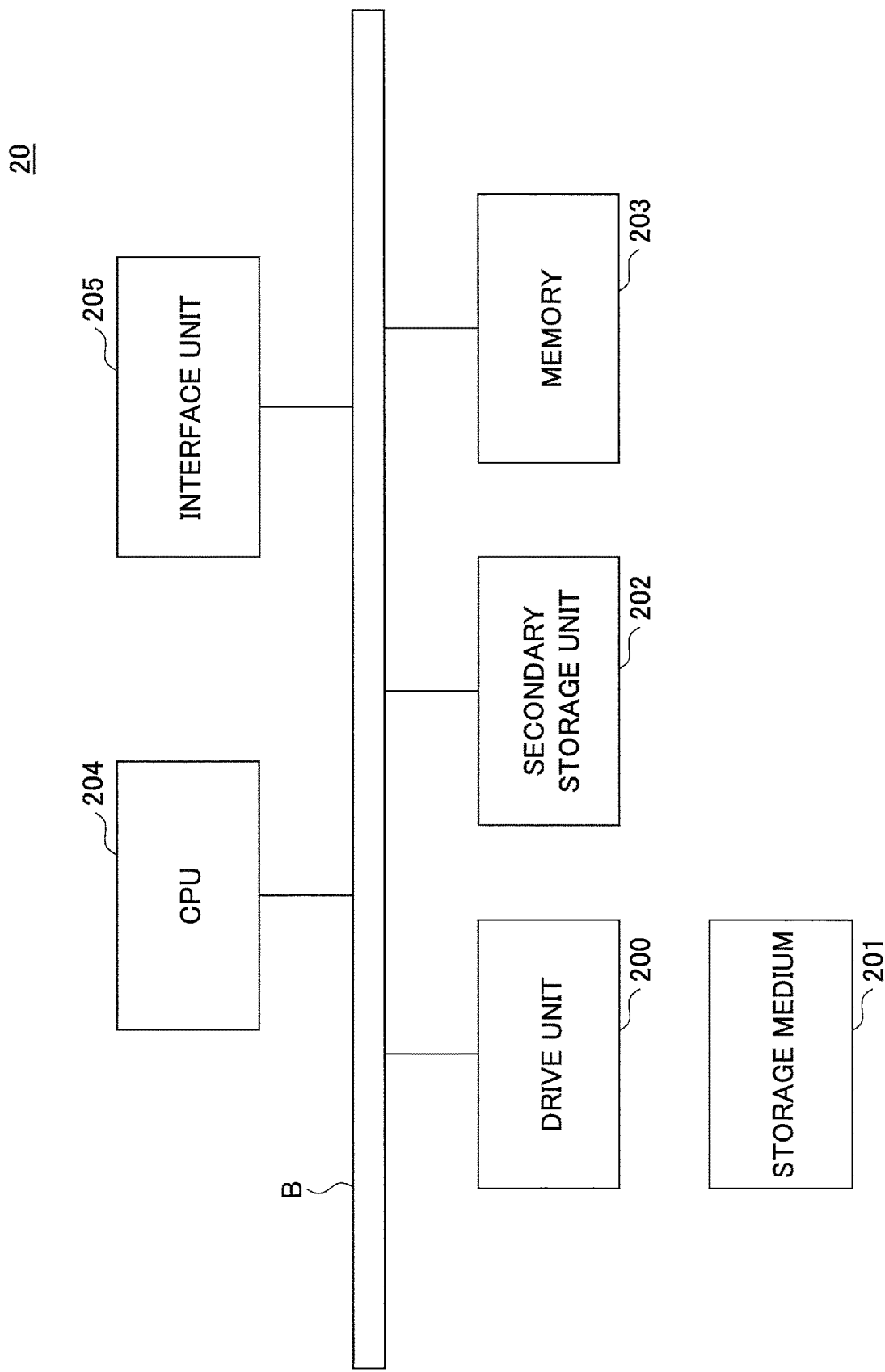
FIG. 3 is a block diagram illustrating an exemplary hardware configuration of an application management server according to an embodiment.

FIG. 3 is a block diagram illustrating an exemplary hardware configuration of the application management server 20 according to an embodiment. As illustrated in FIG. 3, the application management server 20 may include a drive unit 200, a secondary storage unit 202, a memory 203, a CPU 204, and an interface unit 205 that are connected to each other via a bus B.

Programs that cause the application management server 20 to perform various processes may be provided via a storage medium 201. When the storage medium 201 storing programs is mounted on the drive unit 200, the programs are read by the drive unit 200 from the storage medium 201 and are installed in the secondary storage unit 202. The programs may not necessarily be installed from the storage medium 201. Alternatively, the programs may be downloaded via a network from another computer. The secondary storage unit 202 stores the installed programs and other necessary files and data.

The memory 203 temporarily stores programs read from the secondary storage unit 202 when the programs are executed. The CPU 204 executes functions of the application management server 20 according to the programs temporarily stored in the memory 203. The interface unit 205 connects the application management server 20 to a network.

Examples of the storage medium 201 include portable storage media such as a compact disk read-only memory (CD-ROM), a digital versatile disk (DVD), and a universal serial bus (USB) memory. Examples of the secondary storage unit 202 include a hard disk drive (HDD) and a flash memory. The storage medium 201 and the secondary storage unit 202 are examples of computer-readable storage media.

Figure 4:
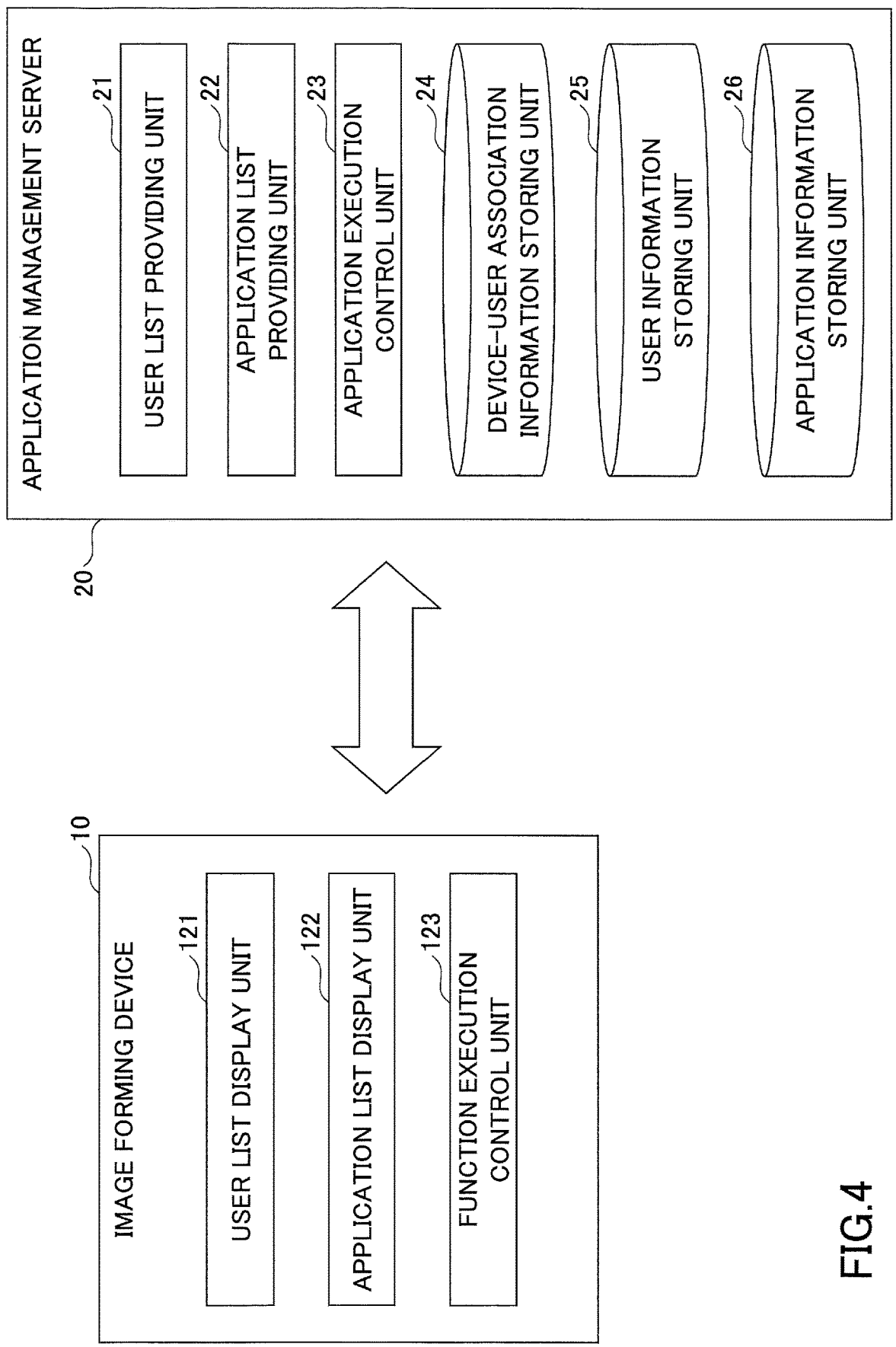
FIG. 4 is a drawing illustrating an exemplary functional configuration of an information processing system according to an embodiment.

FIG. 4 is a drawing illustrating an exemplary functional configuration of the information processing system 1 according to an embodiment. As illustrated in FIG. 4, the application management server 20 may include a user list providing unit 21, an application list providing unit 22, and an application execution control unit 23. These units may be implemented by executing programs installed in the application management server 20 by the CPU 204. The application management server 20 may further include a device-user association information storing unit 24, a user information storing unit 25, and an application information storing unit 26. These storing units may be implemented, for example, by storage areas of the secondary storage unit 202. Alternatively, these storing units may be implemented by storage areas of a storage unit connected via a network to the application management server 20.

The device-user association information storing unit 24 stores device-user association information indicating the correspondence between the image forming devices 10 and users. More specifically, the device-user association information storing unit 24 stores identification information of users in association with identification information of the image forming devices 10. That is, the device-user association information storing unit 24 manages information on users who are likely to use the image forming devices 10.

The user information storing unit 25 stores attribute information (user information) of users. For example, the user information storing unit 25 stores, for each user, identification information (user ID) of the user and identification information of applications that the user uses (or owns). The application information storing unit 26 stores attribute information (application information) of applications.

The device-user association information, the user information, and the application information may be registered beforehand in the corresponding storing units 24, 25, and 26 by the users or the administrators of the image forming devices 10. For example, the device-user association information may be registered in the device-user association information storing unit 24 by the administrators, and the user information and the application information may be registered in (or uploaded to) the user information storing unit 25 and the application information storing unit 26 by the users.

The user list providing unit 21 provides (or sends) a list of user IDs (hereafter referred to as a "user list"), which are stored in the user information storing unit 25 and associated with a "current" image forming device 10 being currently operated, to the current image forming device 10. This configuration allows a user to execute applications being managed by the application management server 20 by operating the image forming device 10.

The application list providing unit 22 provides (or sends) a list of sets of application information (hereafter referred to as an "application list"), which are associated with a user ID selected from the user list at the current image forming device 10, to the current image forming device 10.

The application execution control unit 23 controls execution of an application corresponding to application information selected from the application list at the current image forming device 10.

The image forming device 10 may include a user list display unit 121, an application list display unit 122, and a function execution control unit 123. These units may be implemented by executing programs installed in the image forming device 10 by the CPU 111.

The user list display unit 121 displays the user list sent from the user list providing unit 21 on the operations panel 15. The application list display unit 122 displays the application list sent from the application list providing unit 22 on the operations panel 15. The function execution control unit 123 controls execution of functions of the image forming device 10 that are used by the applications.

Figure 5:
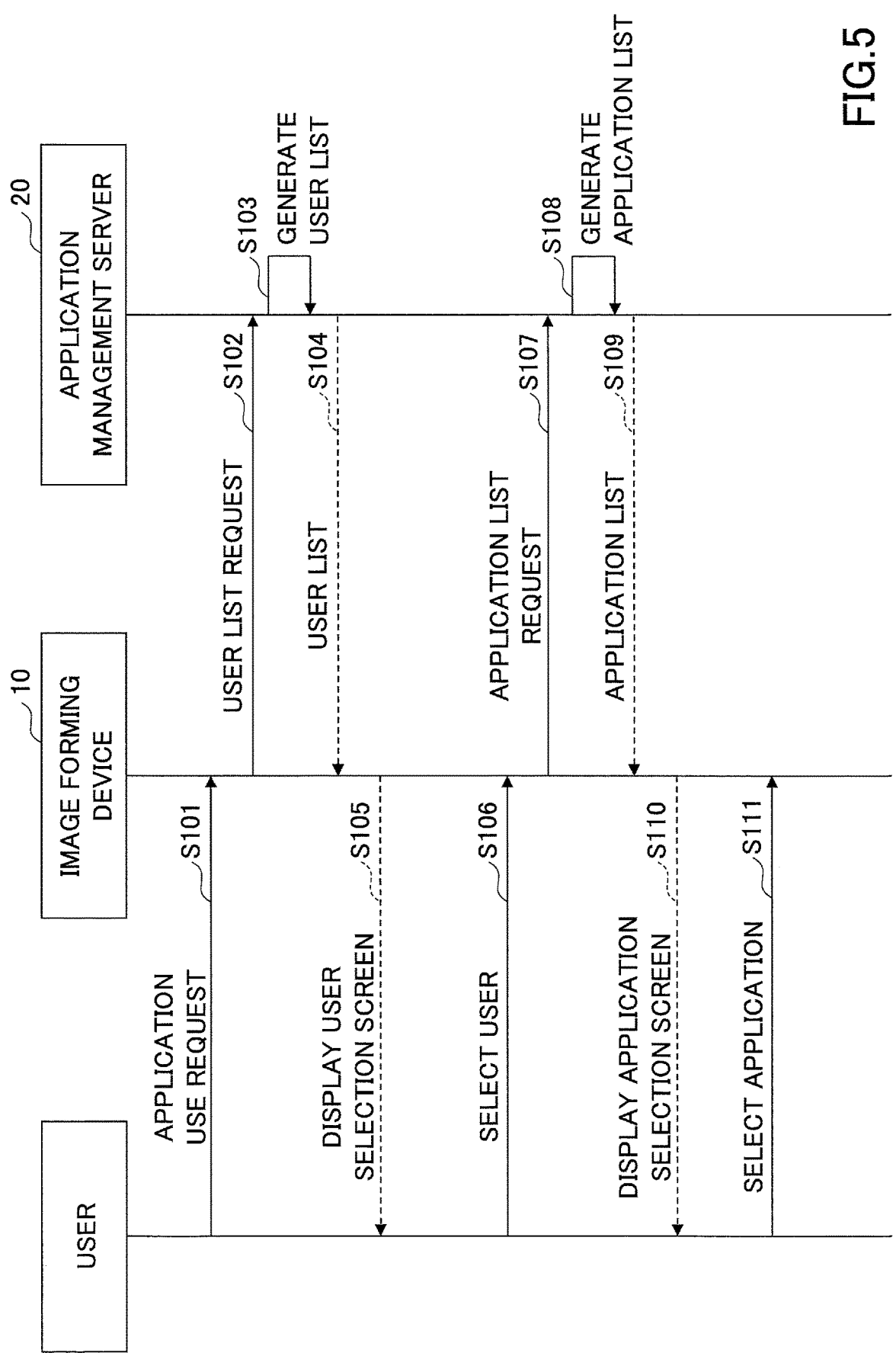
FIG. 5 is a sequence chart illustrating an exemplary process of executing an application registered in an application management server.

Exemplary processes in the information processing system 1 are described below. FIG. 5 is a sequence chart illustrating an exemplary process of executing an application registered in the application management server 20.

When the user inputs a request (application use request) to use applications registered in the application management server 20 via the operations panel 15 of the image forming device 10 (S101), the user list display unit 121 sends a request (user list request) to obtain a user list to the application management server 20 (S102). Here, a user list indicates a list of user IDs registered in the application management server 20. The user list request may include a part of attribute information (hereafter referred to as "device information") of the current image forming device 10.

Figure 6:
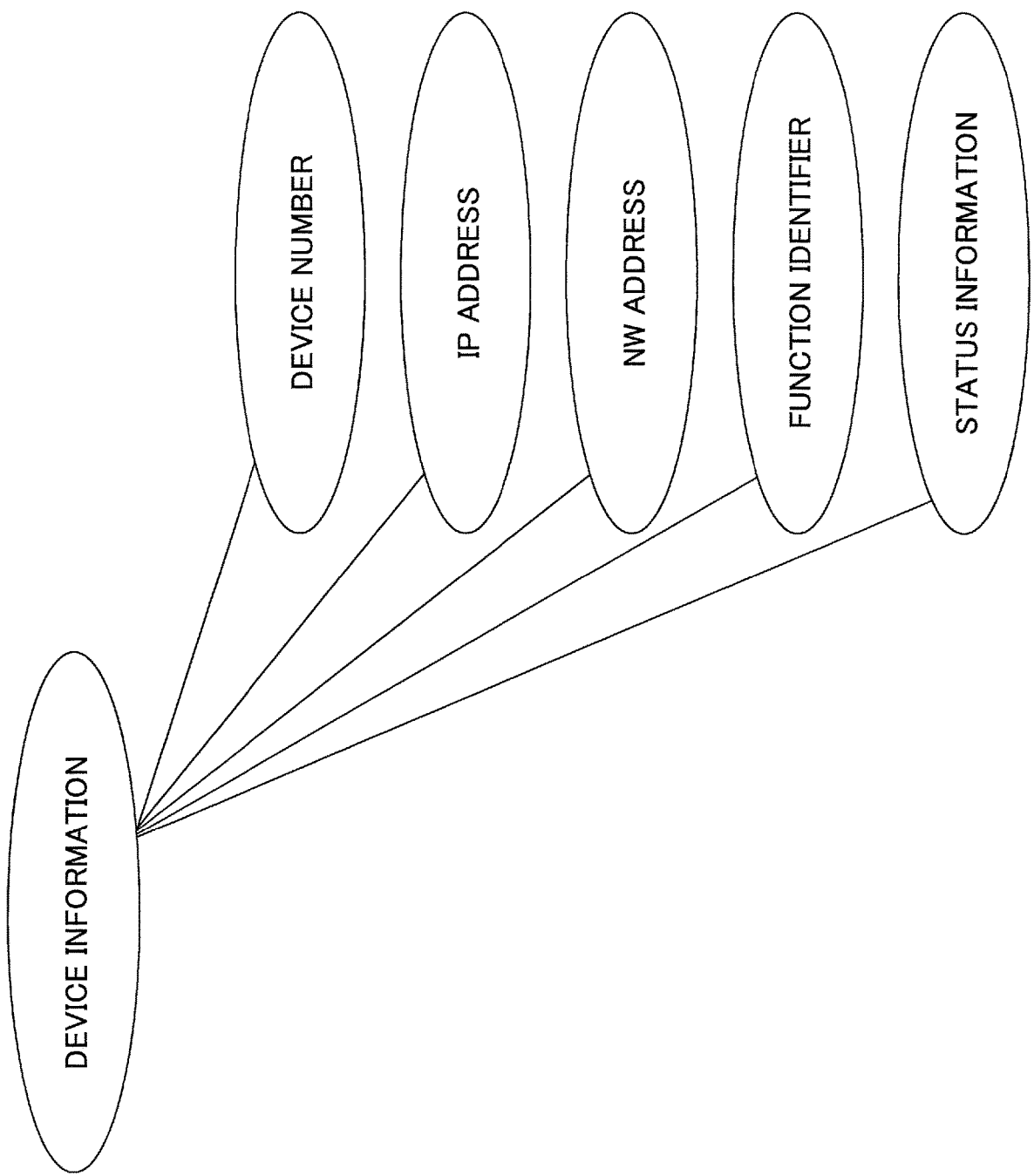
FIG. 6 is a drawing illustrating an exemplary configuration of device information.

FIG. 6 is a drawing illustrating an exemplary configuration of device information. As illustrated in FIG. 6, the device information may include parameters or information items such as a device number, an IP address, a network (NW) address, function identifiers, and status information. These parameters or information items may be obtained from the RAM 112, the ROM 113, the HDD 114, or the NVRAM 115 of the image forming device 10.

The device number, the IP address, and the NW address are examples of identification information of the image forming device 10. The device information specified in the user list request may include at least one of the device number, the IP address, and the NW address.

The device number is an example of individual identification information for identifying each individual image forming device 10. The IP address is an example of communication address information of the image forming device 10 used for communications. The NW address is identification information of a network to which the image forming device 10 belongs (or connected). The NW address may be, for example, the network address portion (or subnet information) of an IP address. In this case, the NW address is obtained by applying a subnet mask to the IP address. Accordingly, image forming devices 10 connected to the same network (or segment) have the same NW address. Alternatively, the NW address may be a domain name of a domain to which the image forming device 10 belongs. Also in this case, image forming devices 10 belonging to the same domain have the same NW address.

The function identifiers identify functions that the image forming device 10 includes. For example, a function identifier "print" indicates a printing function and a function identifier "scan" indicates a scanning function. Attribute information (such as configuration information or execution conditions) that can be specified for the printing function and the scanning function of the image forming device 10 may be attached to the function identifiers. For example, information indicating color modes (color and monochrome) and resolutions may be attached to the function identifier of the scanning function. Similarly, information indicating color modes (color and monochrome) and paper sizes may be attached to the function identifier of the printing function.

The status information indicates the status of functions corresponding to the function identifiers (i.e., whether the functions are available). For example, the status information may indicate that the scanning function of the image forming device 10 is not available for some reason (e.g., failure of the scanner 12).

When the user list request is received at the application management server 20, the user list providing unit 21 performs a user list generation process (S103). In the user list generation process, user IDs related to the current image forming device 10 are extracted from the user IDs stored in the user information storing unit 25. Here, assuming that the application management server 20 provides services via the Internet, a huge number of users (user IDs) may be registered in the user information storing unit 25. In such a case, if all the user IDs registered in the user information storing unit 25 are sent to the image forming device 10 and displayed on the operations panel 15, it is troublesome for the user to select a user ID from the displayed user IDs. According to the present embodiment, to obviate this problem, user IDs that are likely to be selected on the current image forming device 10 are extracted from the user information storing unit 25. Details of the user list generation process are described below.

Figure 7:
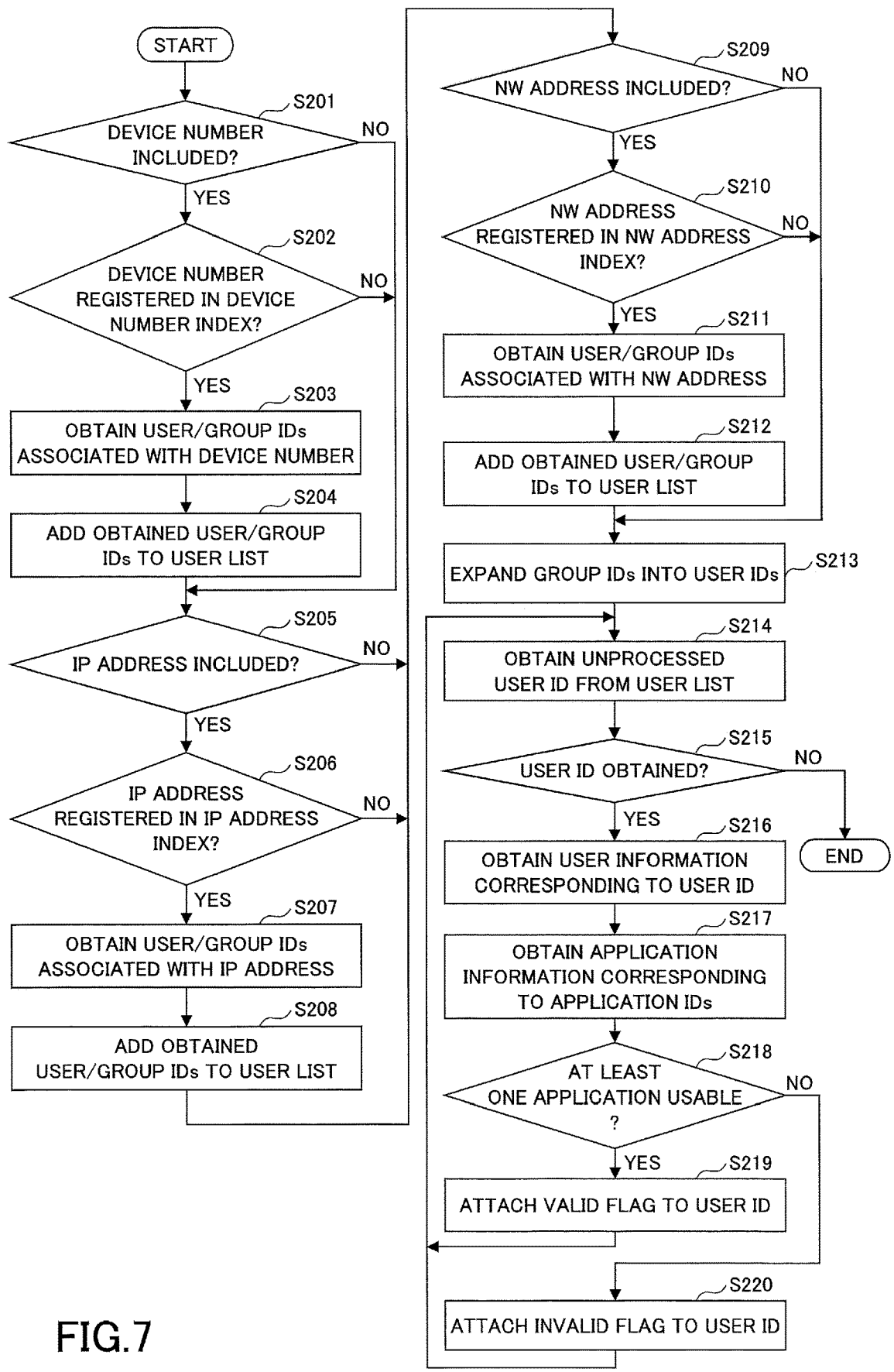
FIG. 7 is a flowchart illustrating an exemplary process of generating a user list.

FIG. 7 is a flowchart illustrating an exemplary process of generating a user list.

In step S201, the user list providing unit 21 determines whether received device information includes a device number. When no device number is included in the device information (NO in S201), the process proceeds to step S205. Meanwhile, when a device number is included in the device information (YES in S201), the user list providing unit 21 determines whether the device number is registered in the device-user association information storing unit 24 (S202).

Figure 8:
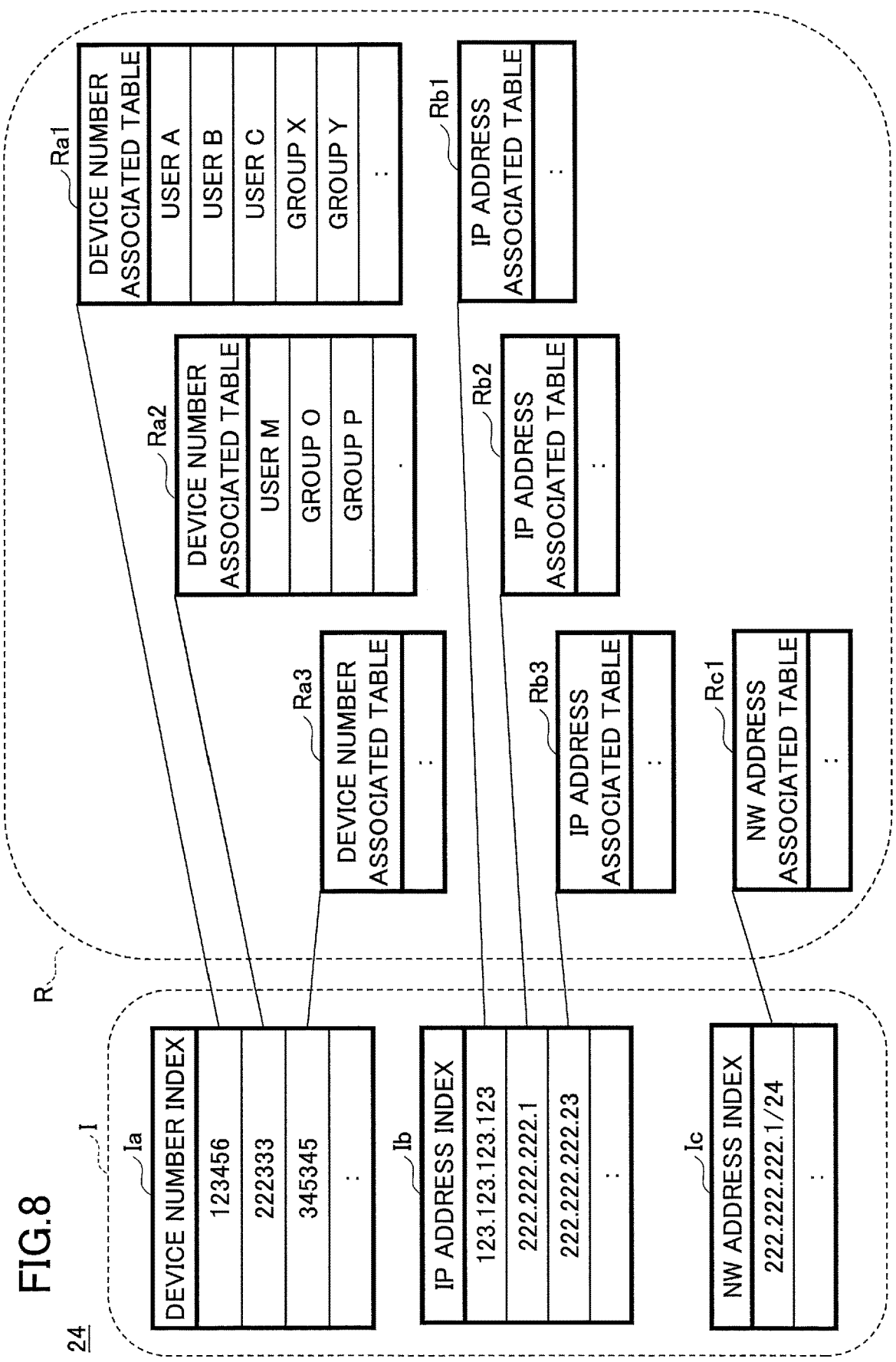
FIG. 8 is a drawing illustrating an exemplary configuration of device-user association information.

FIG. 8 is a drawing illustrating an exemplary configuration of device-user association information stored in the device-user association information storing unit 24. As illustrated in FIG. 8, the device-user association information includes indexes I and associated tables R.

The indexes I include a device number index Ia, an IP address index Ib, and an NW address index Ic. The device number index Ia is a table storing a list of device numbers of the image forming devices 10 registered in the application management server 20. The IP address index Ib is a table storing a list of IP addresses of the image forming devices 10 registered in the application management server 20. The NW address index Ic is a table storing a list of NW addresses of the image forming devices 10 registered in the application management server 20.

An associated table R is provided for each device number, IP address, or NW address stored in the indexes I. The associated table R stores user IDs and/or group IDs associated with the corresponding device number, IP address, or NW address. A group ID is an example of identification information of a group of users. In the example of FIG. 8, associated tables R associated with device numbers in the device number index Ia are referred to as device number associated tables Ra, associated tables R associated with IP addresses in the IP address index Ib are referred to as IP address associated tables Rb, and associated tables R associated with NW addresses in the NW address index Ic are referred to as NW address associated tables Rc.

Take, for example, a device number associated table Ra1 that is associated with a device number "123456". This indicates that user IDs and group IDs in the device number associated table Ra1 are associated with the device number "123456".

In step S202, the user list providing unit 21 determines whether the device number in the received device information is included in the device number index Ia. When the device number is not included in the device number index Ia (NO in S202), the process proceeds to step S205. Meanwhile, when the device number is included in the device number index Ia (YES in S202), the user list providing unit 21 obtains all user IDs and group IDs registered in the device number associated table Ra associated with the device number (S203). Next, the user list providing unit 21 adds the obtained user IDs and group IDs to a user list (S204). The user list has a data structure for storing a list of user IDs and group IDs, and may be generated, for example, in the RAM 112.

In step S205, the user list providing unit 21 determines whether the received device information includes an IP address. When no IP address is included in the device information (NO in S205), the process proceeds to step S209. Meanwhile, when an IP address is included in the device information (YES in S205), the user list providing unit 21 determines whether the IP address is registered in the IP address index Ib in the device-user association information storing unit 24 (S206). When the IP address is not included in the IP address index Ib (NO in S206), the process proceeds to step S209. When the IP address is included in the IP address index Ib (YES in S206), the user list providing unit 21 obtains all user IDs and group IDs registered in the IP address associated table Rb associated with the IP address (S207). Next, the user list providing unit 21 adds the obtained user IDs and group IDs to the user list (S208). In this step, duplicate user IDs and/or duplicate group IDs are removed. For example, the user list providing unit 21 does not add user IDs and group IDs that are already in the user list.

In step S209, the user list providing unit 21 determines whether the received device information includes an NW address. When no NW address is included in the device information (NO in S209), the process proceeds to step S213. Here, when a domain name is used as the NW address, the user list providing unit 21 may be configured to send the IP address in the device information to a domain name system (DNS) server (not shown) to reverse look up a domain name based on the IP address. In this case, steps S210 through S212 may be performed based on the domain name obtained by reverse lookup.

When an NW address is included in the device information (YES in S209), the user list providing unit 21 determines whether the NW address is registered in the NW address index Ic in the device-user association information storing unit 24 (S210). When the NW address is not included in the NW address index Ic (NO in S210), the process proceeds to step S213. Meanwhile, when the NW address is included in the NW address index Ic (YES in S210), the user list providing unit 21 obtains all user IDs and group IDs registered in the NW address associated table Rc associated with the NW address (S211). Next, the user list providing unit 21 adds the obtained user IDs and group IDs to the user list (S212). In this step, duplicate user IDs and/or duplicate group IDs are removed. For example, the user list providing unit 21 does not add user IDs and group IDs that are already in the user list.

In step S213, the user list providing unit 21 expands the group IDs in the user list into user IDs. That is, the user list providing unit 21 converts each group ID into user IDs belonging to a group indicated by the group ID. User IDs belonging to a group ID may be determined, for example, by referring to the user information storing unit 25.

FIG. 9 is a table illustrating an exemplary configuration of user information stored in the user information storing unit 25. As illustrated in FIG. 9, the user information storing unit 25 stores user information for each user registered in the application management server 20. The user information of each user may include, for example, a user ID, a group ID, and registered application information.

The group ID indicates a group to which the user indicated by the user ID belongs. The registered application information is identification information (hereafter referred to as "application IDs") of applications registered (or uploaded) for the user. When multiple applications are registered for a user, the user information of the user includes multiple application IDs.

User IDs belonging to a group ID may be determined, for example, by searching the user information storing unit 25 using the group ID as a key and thereby finding user information including the group ID.

Alternatively, to speed up the search process, a table including a list of user IDs of users belonging to the corresponding group may be prepared in advance for each group ID, and user IDs belonging to a group ID may be determined based on the table.

When user IDs expanded from the group IDs are already registered in the user list, those user IDs are not added to the user list.

The user information storing unit 25 may include a record (user information) where a group ID is specified in the user ID field. In this case, the group ID field of the record may be empty. Also in this case, the registered application field of the record may include application IDs of applications that are available for all the users belonging to a group indicated by the group ID. With such a record, user IDs are associated indirectly, i.e., via a group ID, with application IDs.

Referring back to FIG. 7, the user list providing unit 21 obtains one of the user IDs in the user list as a target ID (S214). Step S215 and the subsequent steps are repeated for the number of user IDs in the user list. Accordingly, when step S214 is performed next time, one of the "unprocessed" user IDs that have not been processed is obtained from the user list. Here, the obtained user ID is not removed from the user list, but remains in the user list.

When a target ID is successfully obtained, i.e., when an "unprocessed" user ID exists in the user list (YES in S215), the user list providing unit 21 obtains user information (see FIG. 9) corresponding to the target ID from the user information storing unit 25 (S216). Next, the user list providing unit 21 obtains, from the application information storing unit 26, application information corresponding to application IDs registered in the obtained user information (S217). Here, when the user information storing unit 25 includes a record whose user ID field contains a group ID that matches a group ID in the obtained user information, the user list providing unit 21 also obtains application information corresponding to application IDs registered in the record from the application information storing unit 26.

FIG. 10 is a table illustrating an exemplary configuration of application information stored in the application information storing unit 26. As illustrated in FIG. 10, the application information storing unit 26 stores application information for each application registered in the application management server 20. The application information of each application may include, for example, an application ID, a linked function identifier, display information, configuration information, and a file name.

The application ID is identification information of the corresponding application. The linked function identifier is an identifier of a function of the image forming device 10 which is used by the application. Examples of linked function identifiers include "print" and "scan". An application having the linked function identifier "print" (i.e., an application that uses the printing function of the image forming device 10) is referred to as a "print application". Meanwhile, an application having the linked function identifier "scan" (i.e., an application that uses the scanning function of the image forming device 10) is referred to as a "scan application".

The display information indicates, for example, a character string and/or an icon displayed for the application. The configuration information includes settings for the application. For example, the configuration information of a print application may include parameters for a print job, and the configuration information of a scan application may include parameters for a scan job.

The file name is the name of an entity (i.e., an executable file) of the application. In other words, the file name is information indicating a location in the secondary storage unit 202 of the application management server 20 where the entity of the application is stored.

Referring again to FIG. 7, the user list providing unit 21 determines whether at least one of the applications corresponding to the obtained application information is usable from the current image forming device 10 (S218). Here, when a function used by an application is valid in the current image forming device 10, the application is usable from the current image forming device 10. The user list providing unit 21 determines whether the applications are usable from the current image forming device 10 based on the linked function identifiers in the obtained application information and the function identifiers and the status information in the received device information (see FIG. 6). More specifically, when the device information includes a function identifier corresponding to the linked function identifier in the application information of an application and the status information in the device information indicates that the function corresponding to the function identifier is valid, the user list providing unit 21 determines that the application is usable from the current image forming device 10.

When at least one of the applications is usable (YES in S218), the user list providing unit 21 attaches a valid flag to the target ID in the user list (S219). When none of the applications is usable (NO in S218), the user list providing unit 21 attaches an invalid flag to the target ID in the user list (S220). Thus, the valid flag or the invalid flag is attached to each user ID in the user list.

When step S216 and subsequent steps have been performed for all the user IDs in the user list (NO in S215), the user list generation process is terminated.

The above step of determining the presence or absence of a usable application for each user ID in the user list may be performed at the image forming device 10 instead of at the application management server 20. In this case, the user list sent to the image forming device 10 may include, instead of the valid and invalid flags, the application information of applications registered for the respective users. The image forming device 10 can determine the presence or absence of usable applications for the respective users based on the application information in the user list.

Referring back to FIG. 5, after generating the user list in step S103, the user list providing unit 21 sends the generated user list to the current image forming device 10 that has sent the user list request (S104).

When the user list is received, the user list display unit 121 of the image forming device 10 displays a user selection screen on the operations panel 15 (S105). The user selection screen allows the user to select the corresponding user ID from the user IDs in the user list.

Figure 11:
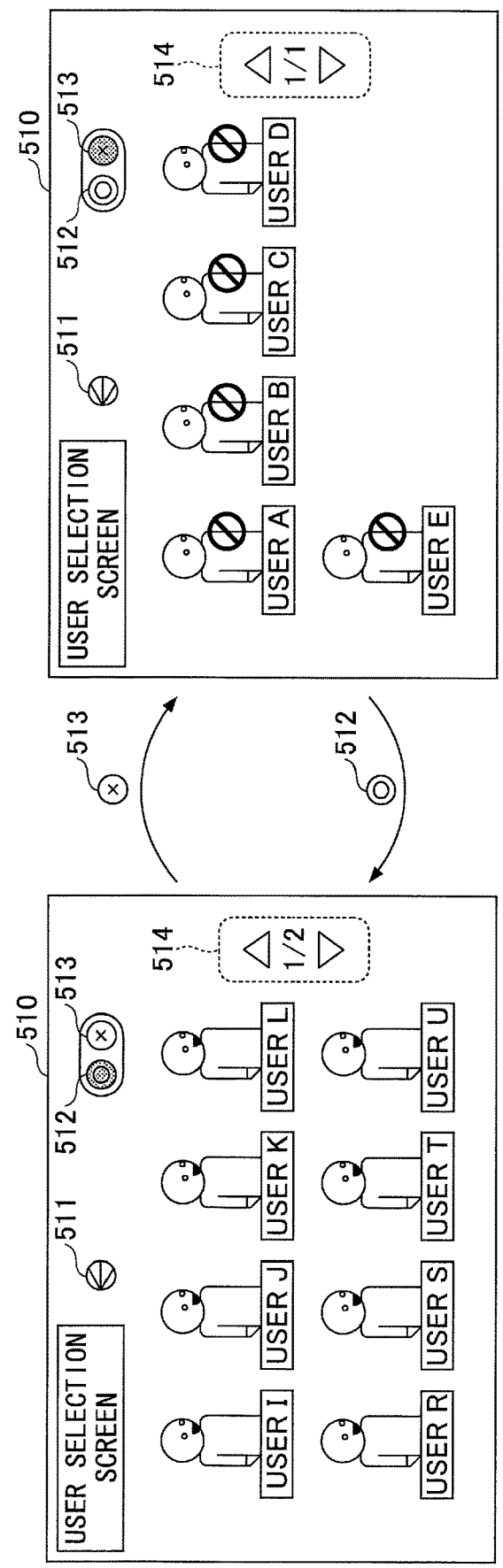
FIG. 11 is a drawing illustrating an exemplary user selection screen.

FIG. 11 illustrates an exemplary user selection screen 510. As illustrated in FIG. 11, the user selection screen 510 includes user icons and user IDs corresponding to the user IDs in the user list. When all the user IDs and user icons do not fit in one screen, a scroll bar 514 becomes active to allow the user to scroll the screen. In the present embodiment, the user IDs in the user list are narrowed down based on the identification information of the image forming device 10. Therefore, even when a huge number of users are registered in the application management server 20, user IDs displayed on the user selection screen 510 are limited, for example, to the user IDs of users in the office where the image forming device 10 is installed or the user IDs of users who usually use the image forming device 10. This configuration makes it possible to reduce or optimize the number of user IDs and user icons displayed on the user selection screen 510.

The user selection screen 510 further includes a back button 511, a valid user display button 512, and an invalid user display button 513.

When the back button 511 is pressed, the image forming device 10 restores a screen displayed on the operations panel 15 before the user selection screen 510 is displayed. When the invalid user display button 513 is pressed, the user list display unit 121 displays user IDs, to which the invalid flag is attached in the user list, on the user selection screen 510. In FIG. 11, the right-side image indicates the user selection screen 510 where the invalid user button 513 is selected. In the user selection screen 510 on the right side of FIG. 11, icons indicating invalid users are superposed on the user icons, and the user icons are, for example, disabled (i.e., not selectable).

When the valid user display button 512 is pressed, the user list display unit 121 displays user IDs to which the valid flag is attached in the user list on the user selection screen 510. In FIG. 11, the left-side image indicates the user selection screen 510 where the valid user button 512 is selected. When the valid user display button 512 is selected, the user icons displayed on the user selection screen 510 are selectable.

Thus, with the user list where the valid flag or the invalid flag is attached to each user ID, the current image forming device 10 can separately display users (valid users) for which at least one application is available and users (invalid users) for which no application is available. This configuration enables an invalid user to determine that no application is available on the current image forming device 10 without selecting the corresponding user icon. Meanwhile, for a valid user, this configuration makes it possible to easily find out the corresponding user icon from a screen where user icons of invalid users are removed.

The user list providing unit 21 of the application management server 20 may be configured to exclude user IDs of invalid users from the user list. In this case, however, when the user icon of a user registered in association with the current image forming device 10 is not displayed on the user selection screen 510, the user cannot accurately determine the reason, i.e., whether the user icon is not displayed because of a failure, or because no application is available for the user. In the present embodiment, to prevent this problem, user IDs of invalid users are also included in the user list with the invalid flag attached.

Figure 12:
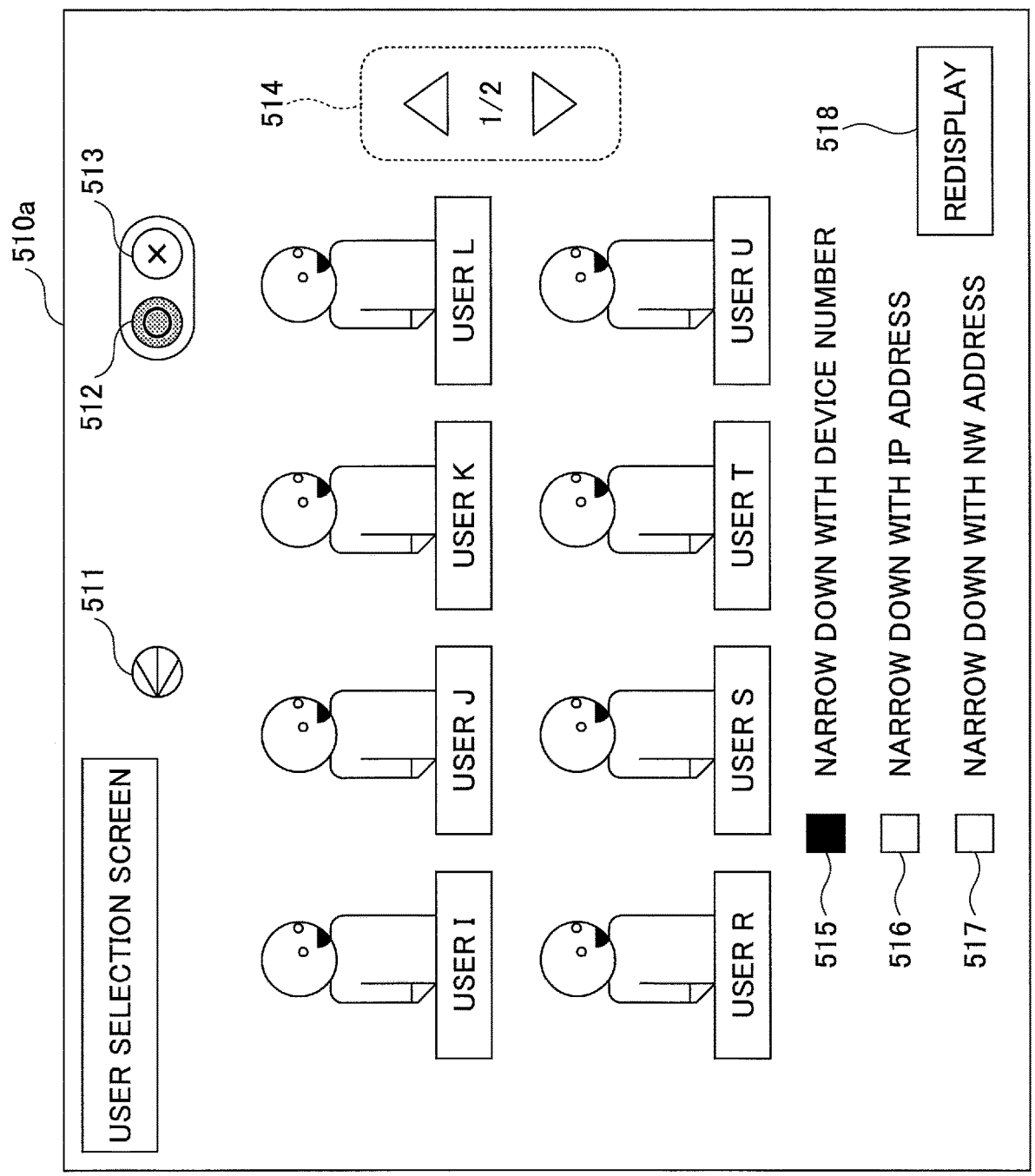
FIG. 12 is a drawing illustrating another exemplary user selection screen.

FIG. 12 is a drawing illustrating another exemplary user selection screen 510*a*. The same reference numbers as in FIG. 11 are assigned to the corresponding components in FIG. 12 and descriptions of those components are omitted here.

As illustrated in FIG. 12, the user selection screen 510*a* includes check buttons 515 through 517 and a redisplay button 518 in addition to the components illustrated in FIG. 11. The check buttons 515 through 517 allow the user to set conditions (narrow-down conditions) for narrowing down user information to be included in the user list. When the check button 515 is selected, user information is narrowed down based on the device number. When the check button 516 is selected, user information is narrowed down based on the IP address. When the check button 517 is selected, user information is narrowed down based on the NW address. One or more of the check buttons 515 through 517 may be selected at the same time.

When one or more of the check buttons 515 through 517 are selected or deselected and the redisplay button 518 is pressed, steps S102 through S105 are performed again. In this case, in step S102, the user list display unit 121 specifies one or more of the device number, the IP address, and the NW address as device information in the user list request according to the selection of the check buttons 515 through 517, and sends the user list request to the application management server 20. This configuration makes it possible to make the narrow-down condition less or more strict.

For example, when the user selection screen 510*a* is initially displayed (i.e., when step S102 is performed first time), the device information in the user list request may include the device number or the IP address and not include the NW address. If the icon corresponding to the user (may be referred to as a "current user") who is operating the image forming device is not included in the initially-displayed user selection screen 510*a*, the current user may select the check button 517 and press the redisplay button 518. As a result, in step S102 performed again, the NW address is included in the device information in the user list request in addition to the device number or the IP address. In this case, since plural image forming devices may have the same NW address, the narrow-down condition becomes less strict. Accordingly, the likelihood that the user selection screen 510*a* displayed again includes the icon corresponding to the current user increases.

Meanwhile, when the icon corresponding to the current user is included in the initially-displayed user selection screen 510*a*, the current user can find out the icon from a smaller number of icons.

Alternatively, the device information in the user list request may include all of the device number, the IP address, and the NW address even when the user selection screen 510*a* is initially displayed (i.e., when step S102 is performed first time). If the number of icons included in the initially-displayed user selection screen 510*a* is large, the user may deselect the check button 517 and press the redisplay button 518. As a result, in step S102 performed again, the NW address is excluded from the device information in the user list request. In this case, the narrow-down condition becomes stricter, and therefore the number of icons in the user selection screen 510*a* displayed again may be reduced.

Referring back to FIG. 5, when at least one application is available for the current user, the current user selects the corresponding icon on the user selection screen 510 (S106). When the icon is selected, the application list display unit 122 sends a request (application list request) for an application list to the application management server 20 (S107). Here, an application list indicates sets of application information. The application list request may include a user ID corresponding to the selected icon.

When the application list request is received at the application management server 20, the application list providing unit 22 generates an application list including application information of applications registered for the user corresponding to the user ID specified in the application list request (S108). More specifically, the application list providing unit 22 obtains user information corresponding to the user ID from the user information storing unit 25. Then, the application list providing unit 22 obtains application information corresponding to application IDs (registered application information) in the obtained user information from the application information storing unit 26.

Next, the application list providing unit 22 sends the generated application list to the current image forming device 10 (S109). When the application list is received at the image forming device 10, the application list display unit 122 displays an application selection screen on the operations panel 15 (S110). The application selection screen allows the user to select an application to be executed from applications corresponding to the application information in the application list.

Figure 13:
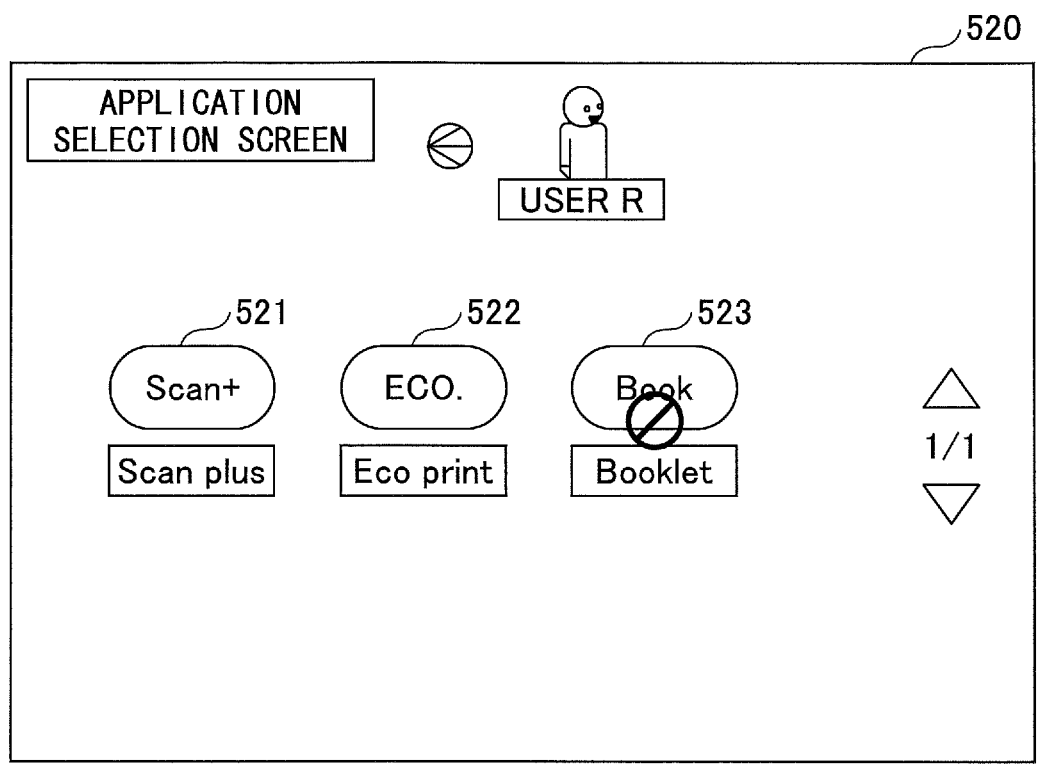
FIG. 13 is a drawing illustrating an exemplary application selection screen.

FIG. 13 illustrates an exemplary application selection screen 520. As illustrated in FIG. 13, the application selection screen 520 includes icons and application names corresponding to the application information in the application list. In this example, icons 521 through 523 are displayed on the application selection screen 520. The icons and the application names are displayed based on the display information in the application information. An icon indicating an invalid application is superposed on the icon 523, and the icon 523 is disabled (i.e., not selectable). This indicates that the application corresponding to the icon 523 is not executable on the current image forming device 10. Whether an application is executable may be determined as described in step S218 of FIG. 7. The process of determining whether applications are executable may be performed at the application management server 20 when the application list is generated, or at the image forming device 10 when the application selection screen 520 is displayed.

On the application selection screen 520, the user selects an icon of a desired application (S111). Hereafter, the application corresponding to the selected icon is referred to as a "target application". The function execution control unit 123 determines whether the target application is a scan application or a print application based on the linked function identifier in the application information of the target application.

The process performed after the icon is selected differs depending on whether the target application is a scan application or a print application. Therefore, processes of executing a scan application and a print application are described separately below.

Figure 14:
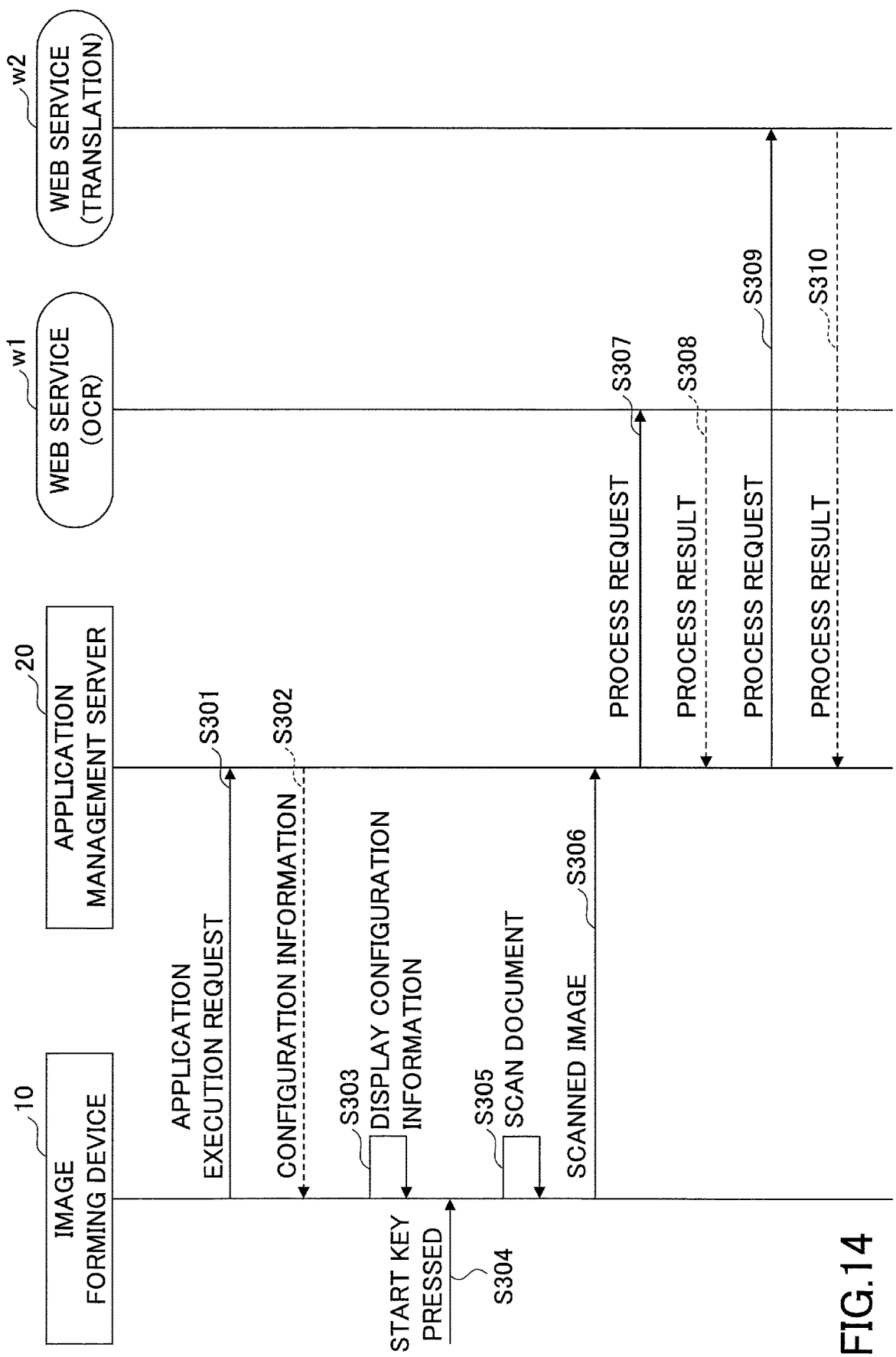
FIG. 14 is a sequence chart illustrating an exemplary process of executing a scan application.

FIG. 14 is a sequence chart illustrating an exemplary process of executing a scan application.

In step S301 of FIG. 14, the function execution control unit 123 sends an application execution request including the application ID of the target application to the application management server 20. In response, the application execution control unit 23 of the application management server 20 requests the target application corresponding to the application ID to perform a process. For example, the application execution control unit 23 identifies the file name of the executable file of the target application corresponding to the application ID by referring to the application information storing unit 26, and executes the executable file. When requested (or executed), the target application sends its configuration information to the function execution control unit 123 of the image forming device 10 (S302). In the present embodiment, it is assumed that returning configuration information in response to an application execution request is defined in a scan application as a protocol or a rule in collaborating with the image forming device 10. The configuration information of each application is stored in the application information storing unit 26 in association with the corresponding application ID.

When the configuration information is received, the function execution control unit 123 of the image forming device 10 displays, on the operations panel 15, the configuration information and a message requesting the user to set a document to be scanned (S303).

When the user sets a document on a pressing plate or an auto document feeder (ADF) of the scanner 12 and presses a start key (S304), the function execution control unit 123 causes the scanner 12 to scan the document to obtain image data (hereafter called "scanned image"), and stores the scanned image in the RAM 112 or the HDD 114 (S305).

Next, the function execution control unit 123 sends the scanned image together with the application ID of the target application to the application management server 20 (S306).

When the scanned image and the application ID are received, the application execution control unit 23 of the application management server 20 inputs (or sends) the scanned image to the target application corresponding to the application ID.

The target application performs a process implemented therein on the scanned image. The process performed on the scanned image varies from one application to another. In the example of FIG. 14, the target application requests a Web service w1 providing an optical character recognition (OCR) service to perform OCR on the scanned image (S307). The Web service w1 performs OCR on the scanned image to obtain text data and sends the text data to the target application (S308). Next, the target application requests a Web service w2 providing a translation service to translate the text data (S309). The Web service w2 translates the text data (e.g., from English to Japanese) and sends the translated text data to the target application (S310).

Assuming that the translated text data are the final output of the target application, how to make the translated text data available to the user may also be defined in the target application. For example, the target application may be configured to upload the translated text data to a predetermined Web server or file server. In this case, the user can download the translated text data from the Web server or the file server. As another example, the target application may be configured to send the translated text data to an email address of the user. In this case, the email address may be included, for example, in the configuration information of the target application.

The above described process performed by the target application, where OCR is performed on a scanned image to obtain text data and the text data are translated, is just a non-limiting example. As described above, the process performed by an application depends on how the application is configured. For example, an application may be configured to not use any Web service. Also, image processing (such as a conversion process) to be performed on a scanned image may be implemented in an application.

Next, an exemplary process of executing a print application is described below with reference to FIG. 15.

In step S401 of FIG. 15, the function execution control unit 123 sends an application execution request including the application ID of the target application to the application management server 20. In response, the application execution control unit 23 of the application management server 20 requests the target application corresponding to the application ID to perform a process. For example, the application execution control unit 23 identifies the file name of the executable file of the target application corresponding to the application ID by referring to the application information storing unit 26, and executes the executable file. When requested (or executed), the target application sends print data to the image forming device 10 (S405). In the present embodiment, it is assumed that returning print data in response to an application execution request is defined in a print application as a protocol or a rule in collaborating with the image forming device 10.

However, how the print data are generated varies from one application to another. In the example of FIG. 15, the target application sends a request for document data (document data request) to a Web service w3 providing a document management service (S402). Here, it is assumed that document data have been uploaded by the user to the Web service w3. In this case, the identification information of the document data to be obtained may be included, for example, in the configuration information of the target application. The Web service w3 sends requested document data to the target application (S403). Next, the target application generates print data based on the document data (S404). For example, the target application generates the print data using an application program and a printer driver corresponding to the document data. Then, as already described above, the target application sends the print data to the image forming device 10 (S405).

The print data may be generated through any other process. For example, the target application may be configured to obtain document data from a predetermined folder in the application management server 20 and to generate print data based on the obtained document data. As another example, the target application may be configured to collect and edit information available on the Internet to create document data and generate print data based on the created document data.

When the print data are received, the function execution control unit 123 of the image forming device 10 causes the printer 13 to print the print data (S406). As a result, a recording medium (e.g., paper) where an image is formed according to the print data is output from the printer 13. Then, the function execution control unit 123 sends a printing result (information indicating whether a printing process has been successfully completed) together with the application ID of the target application to the application management server 20 (S407).

When the printing result and the application ID are received, the application execution control unit 23 of the application management server 20 inputs the printing result to the target application corresponding to the application ID. The target application may be further configured to perform a process according to the printing result. For example, the target application may be configured to send the printing result to the email address of the user or to upload the printing result to a predetermined Web server or file server.

As described above, the present embodiment makes it possible to reduce user operations on a user interface. More specifically, the present embodiment makes it possible to limit users (i.e., icons) displayed on the user selection screen 510 to those associated with the current image forming device 10. This in turn makes it possible to reduce the number of user icons displayed on the user selection screen 510, and enables the user to easily find out the corresponding user icon from a small number of user icons.

In the above descriptions, the image forming device 10 is used as an example of a device. However, the present embodiment may also be applied to any other device (e.g., an electronic device) capable of providing a function to an information processing apparatus. Examples of such devices may include a digital camera, a projector, and electric home appliances.

In the above embodiment, the application management server 20 is an example of an information processing apparatus, the secondary storage unit 202 is an example of a storage unit, the user list providing unit 21 is an example of a user list providing unit, and the application list providing unit 22 is an example of a program list providing unit.

An aspect of this disclosure provides an information processing apparatus, an information processing method, and a storage medium storing program code that make it possible to reduce user operations on a user interface.

An information processing apparatus, an information processing method, and a storage medium of preferred embodiments are described above. However, the present invention is not limited to the specifically disclosed embodiments, and variations and modifications may be made without departing from the scope of the present invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An image forming apparatus connectable to an application management server, the image forming apparatus comprising:
    a processor that executes program code stored in a memory to perform a process including,
        sending a user list request including identification information of the image forming apparatus input by a user to request the application management server to generate a list of user identifiers that are limited based on the identification information of the image forming apparatus,
        receiving the list of user identifiers limited based on the identification information of the image forming apparatus from the application management server,
        displaying, on a display, a user selection screen including the received list of user identifiers limited based on the identification information of the image forming apparatus,
        receiving a user identifier that is selected by the user from among the list of user identifiers in the user selection screen,
        receiving application information corresponding to the selected user identifier from the application management server, and
        displaying, on the display, configuration information of an application included in the application information received from the application management server.

2. The image forming apparatus as claimed in claim 1, wherein the identification information indicates at least one of a device number of the image forming apparatus, an IP address of the image forming apparatus, and a network address of a network to which the image forming apparatus belongs.

3. A method performed by an image forming apparatus connectable to an application management server, the method comprising:
    sending, by a processor of the image forming apparatus, a user list request including identification information of the image forming apparatus input by a user to request the application management server to generate a list of user identifiers that are limited based on the identification information of the image forming apparatus;
    receiving the list of user identifiers limited based on the identification information of the image forming apparatus from the application management server;
    displaying, on a display, a user selection screen including the received list of user identifiers limited based on the identification information of the image forming apparatus;
    receiving a user identifier that is selected by the user from among the list of user identifiers in the user selection screen;
    receiving application information corresponding to the selected user identifier from the application management server; and
    displaying, on the display, configuration information of an application included in the application information received from the application management server.

4. The method as claimed in claim 3, wherein the identification information indicates at least one of a device number of the image forming apparatus, an IP address of the image forming apparatus, and a network address of a network to which the image forming apparatus belongs.

5. A non-transitory computer-readable storage medium storing program code for causing an image forming apparatus connectable to an application management server to execute a process, the process comprising:
    sending a user list request including identification information of the image forming apparatus input by a user to request the application management server to generate a list of user identifiers that are limited based on the identification information of the image forming apparatus;
    receiving the list of user identifiers limited based on the identification information of the image forming apparatus from the application management server;

displaying, on a display, a user selection screen including the received list of user identifiers limited based on the identification information of the image forming apparatus;

receiving a user identifier that is selected by the user from among the list of user identifiers in the user selection screen;

receiving application information corresponding to the selected user identifier from the application management server; and displaying, on the display, configuration information of an application included in the application information received from the application management server.

6. The non-transitory computer-readable storage medium as claimed in claim 5, wherein the identification information indicates at least one of a device number of the image forming apparatus, an IP address of the image forming apparatus, and a network address of a network to which the image forming apparatus belongs.

* * * * *